(12) United States Patent
Woods et al.

(10) Patent No.: US 7,461,087 B2
(45) Date of Patent: Dec. 2, 2008

(54) TECHNOLOGY MANAGEMENT SYSTEM USING KNOWLEDGE MANAGEMENT DISCIPLINES, WEB-BASED TECHNOLOGIES, AND WEB INFRASTRUCTURES

(75) Inventors: Steven D. Woods, Seattle, WA (US); James W. Ginn, Seattle, WA (US); David R. Brandes, Maple Valley, WA (US); Charles F. Wagner, Covington, WA (US)

(73) Assignee: The Boeing Company, Chicago, IL (US)

(*) Notice: Subject to any disclaimer, the term of this patent is extended or adjusted under 35 U.S.C. 154(b) by 1613 days.

(21) Appl. No.: 09/746,619

(22) Filed: Dec. 21, 2000

(65) Prior Publication Data

US 2002/0120481 A1 Aug. 29, 2002

(51) Int. Cl.
*G06F 17/30* (2006.01)
(52) U.S. Cl. .............................. 707/104.1; 707/4; 707/5
(58) Field of Classification Search ................. 707/1–8, 707/104.1
See application file for complete search history.

(56) References Cited

U.S. PATENT DOCUMENTS

| | | | | |
|---|---|---|---|---|
| 5,634,124 | A * | 5/1997 | Khoyi et al. ............ 707/103 R |
| 5,694,523 | A * | 12/1997 | Wical ......................... 706/45 |
| 5,923,552 | A * | 7/1999 | Brown et al. ................ 700/100 |
| 5,956,483 | A * | 9/1999 | Grate et al. .................. 709/203 |
| 6,212,494 | B1 * | 4/2001 | Boguraev ....................... 704/9 |
| 6,389,409 | B1 * | 5/2002 | Horovitz et al. ................. 707/2 |
| 6,487,545 | B1 * | 11/2002 | Wical ......................... 706/45 |
| 6,681,369 | B2 * | 1/2004 | Meunier et al. ............. 715/255 |
| 6,732,088 | B1 * | 5/2004 | Glance ......................... 707/3 |
| 6,959,268 | B1 * | 10/2005 | Myers Jr. et al. ............... 703/6 |
| 2002/0042744 | A1 * | 4/2002 | Kohl ........................... 705/14 |
| 2002/0042789 | A1 * | 4/2002 | Michalewicz et al. .......... 707/3 |
| 2002/0077919 | A1 * | 6/2002 | Lin et al. ...................... 705/26 |
| 2002/0091835 | A1 * | 7/2002 | Lentini et al. ............... 709/227 |
| 2003/0055652 | A1 * | 3/2003 | Nichols et al. .............. 704/275 |
| 2005/0055306 | A1 * | 3/2005 | Miller et al. .................. 705/37 |

OTHER PUBLICATIONS

Shu-Hsien L. Chen, "searching the online catalog and the world wide web", Sep. 2003, Journal of education media and library science, pp. 29-43.*
Barbara I. Dewey, "In dearch of services: analyzing the findability of links on CIC university libraries' web pages", Apr. 8-11, 1999, Detroit Michigan, pp. 1-5.*

* cited by examiner

*Primary Examiner*—Don Wong
*Assistant Examiner*—Hanh B Thai
(74) *Attorney, Agent, or Firm*—Harness, Dickey & Pierce, P.L.C.

(57) ABSTRACT

A method and system for managing technologies supports both local and enterprise level requirements. The management system has a controlled lexicon containing technology-specific terminology data, and a web-based collaboration tool. The collaboration tool populates a card catalog based on the technology-specific terminology data and based on collaboration input provided by one or more stewards. The management system further includes a web portal for maintaining a bookshelf of links to entries in the card catalog. A bookshelf of links is maintained over a networking connection based on entries of the card catalog. A bookshelf is accessed based on a search input from a user. The steward and user may be remotely located or may be employees of different organizations.

30 Claims, 7 Drawing Sheets

| Concept Function | | Requirements |
|---|---|---|
|  | W E B   B A S E D   D E L I V E R Y   S Y S T E M | Enterprise Info Visibility -- Reuse<br>1. create & manage multiple custom views<br>2. share blocks across views<br>3. support search & navigation<br>4. support restricted information access |
|  | | Enterprise Info Visibility -- Management<br>1. taxonomy management<br>2. vocabulary management<br>3. navigation capability management<br>4. security filter management |
|  | | Bookshelf Services & Processes<br>1. Information Asset Attribution Process<br>2. Readiness Attribution Process<br>3. Validation Recording Process<br>4. Security Attribution Process<br>5. Common Vocabulary Attribution Process<br>6. Thesaurus Association Process<br>7. Taxonomy Association Process<br>8. Integration (components & information sources)<br>9. Owner, Author, Steward Attribution Process |
|  | | Local Communities<br>1. support collaboration<br>   • within workgroups<br>   • with external suppliers<br>2. support knowledge creation<br>   • authoring, tagging, reviewing, commenting<br>   • sense-making & decision-making processes<br>   • information mining, mapping, visualizing |
|  | | Computing Infrastructure<br>1. Desktop Tools<br>2. Security Infrastructure<br>3. Middleware Capabilities<br>4. Data Management Capabilities<br>5. Delivery System Platforms, Communication<br>6. Application Systems |

The Taxonomy supports the *Navigation* mechanisms.

TECHNOLOGY MANAGEMENT SYSTEM USING KNOWLEDGE MANAGEMENT DISCIPLINES, WEB-BASED TECHNOLOGIES, AND WEB INFRASTRUCTURES

BACKGROUND OF THE INVENTION

1. Technical Field

The present invention relates generally to the management of technologies within and between organizations. More particularly, the invention relates to a method and system for managing technologies that supports both local and enterprise level requirements.

2. Background Art

In today's increasingly technological environment, many companies are beginning to appreciate the importance of innovation. It is also relatively well accepted that in order for innovation to truly flourish, collaboration among individuals is critical. While collaboration groups are not new to the industry, the global economy has recently led to a "fragmentation" of the typical company (or organizational structure) leading to difficulties in the collaboration process. For example, the sharing of thoughts and ideas has transitioned from face-to-face interaction to remote interaction. Thus, an individual having the appropriate technological background to participate in a particular collaboration group is often no longer located on even the same continent as the other individuals in the collaboration group.

It is well documented that another important factor to the successful development of new technologies is the market. For example, customer requirements and other market-driven parameters have typically determined whether or not a given technology is ultimately successful. These market-driven parameters, however, have traditionally been conceptually divorced from the above-discussed collaboration considerations. It is therefore desirable to provide a system and method for dealing with issues such as global competition, the place of change, the introduction and adaptation of technologies, the need to drive the cost and cycle time for development down, the need to improve internal and external communication processes, and the need to stimulate innovation.

While a number of organizations have attempted to address these issues, certain difficulties remain. For example, one approach has been entitled the "Engineering Book of Knowledge" (EBOK). The EBOK is a living document database that allows teams, termed "tech clubs", to document and keep up-to-date on such topics as lessons learned, preferred practices, research into emerging technologies, job functions and benchmarking results. The tech clubs are cross-platform groups having a common interest—such as wiper, dimensional control, or sealing in the automotive context—which meet to share problems, create solutions, and share lessons learned. The direction of the EBOK approach is to primarily support the tech clubs in performing their work. A moderator/facilitator introduces new and modified content based on the results of facilitative sessions. The scope is therefore to provide support to individual tech clubs as they manage their own information and solve technical problems within their domain. The technical approach has generally been to use Lotus Notes commercially available from IBM. The EBOK approach therefore serves only local and function-specific needs. This type of local and function-specific solution does not adequately support enterprise needs for sharing information and participating in connection processes.

It is also important to point out that the above approach requires all of the users of the system to deal with the same collaboration tool (namely, Lotus Notes), whether that tool fits the needs of the particular user or not. In fact, it is quite common for various collaboration groups within an enterprise to have drastically different local requirements. Imagine, for example, the individuals in a tool shop being forced to use the same collaboration tool as the individuals in the accounting department. This problem is especially apparent when existing tools have already proven to be effective. It is this "single tier" approach that reduces flexibility and often results in rejection of the overall system.

Another approach seeks to satisfy two types of knowledge sharing requirements. The first is the creation of a knowledge repository, e.g., a bookshelf type system. The other is an information delivery system, called a "cockpit" system, that gives push notification to support manufacturing operations. The direction of this approach is to support operations awareness and production problem solving. It is important to note that this direction is quite different from the direction of product improvement and innovation support. The scope of this conventional approach is assembly, test and manufacturing systems operational information and business scenario planning. Applications are provided for information capture, management, and distribution. Within this scope, the governing principle is to "copy exactly" (or replicate) data so that all people view a consistent, reliable set of information. This approach uses Documentum (an off-the-shelf document management system) to centrally manage the target documents and information. Commercially available SEMIO® software is used to support taxonomy building and management, viewing and information delivery. These technologies are used within a Microsoft 2000® software environment for supporting communication and coordination services. It is important to note that this approach uses a "cybrarian" to serve as a focal point for supporting the publishing process out of the local group.

It should be noted that the distribution of responsibility can be viewed as a spectrum ranging from the "librarian" approach to the "steward" approach. At the librarian end of the spectrum, a single individual is responsible for maintaining and providing access to all of the information shared between the individuals in the enterprise group. Thus, the librarian approach represents a minimum distribution of responsibilities. At the steward end of the spectrum, each individual is responsible for maintaining and providing access to the information corresponding to that individual. Thus, the steward approach represents a maximum distribution of responsibilities.

While the cybrarian approach (between librarian and steward on the spectrum) provides a centralized decision-making mechanism, it is often desirable to provide a more localized approach. For example, under the cybrarian approach, each individual does not have the ability to define collaboration parameters for the piece of information being shared. It is therefore desirable to provide a system and method that provides a maximum amount of flexibility while maintaining security at the collaboration level.

It is also important to note that the above approach suffers from the same single tier problems as the EBOK approach. Thus, this system requires the many distributed individuals to interact with a tool unrelated to their local business processes and environment.

SUMMARY OF THE INVENTION

The above and other objectives are provided by a method and technology management system in accordance with the present invention. The technology management system has a controlled lexicon, a web-based collaboration tool, and a web portal. The controlled lexicon contains technology-specific terminology data, and the collaboration tool populates a card catalog based on the technology-specific terminology data. The data contained in the controlled lexicon can be accessed as well as modified (subject to a review process) by any of the individuals in an enterprise group. The controlled lexicon is therefore enterprise-wide. The collaboration tool further populates the card catalog based on collaboration input. The web portal maintains a bookshelf of links to entries in the card catalog. The web portal further accesses the bookshelf content, which is distributed across collaboration groups, based on search input and a unified search capability, based on multiple possible arrangements of the content into navigational views, and based on the technology-specific terminology data. Integrating the above components into a technology management system provides functionality at the enterprise level as well as the collaboration level that is unavailable under conventional approaches. This two tier approach also allows collaboration groups to participate by using a variety of tools (e.g. web enabled collaboration tools, file system repositories, document management systems, and databases) already available in the local environment.

Further in accordance with the present invention, a method for managing technologies among a plurality of individuals is provided. The method includes the steps of maintaining a card catalog based on collaboration input from a user, and maintaining a bookshelf of links based on entries in the card catalog. The method further provides for accessing the bookshelf based on search input from a second user.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one of ordinary skill in the art by reading the following specification and sub-joined claims and by referencing the following drawings, in which:

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numerals will be used throughout the drawings to refer to the same or like parts.

Figure 1:
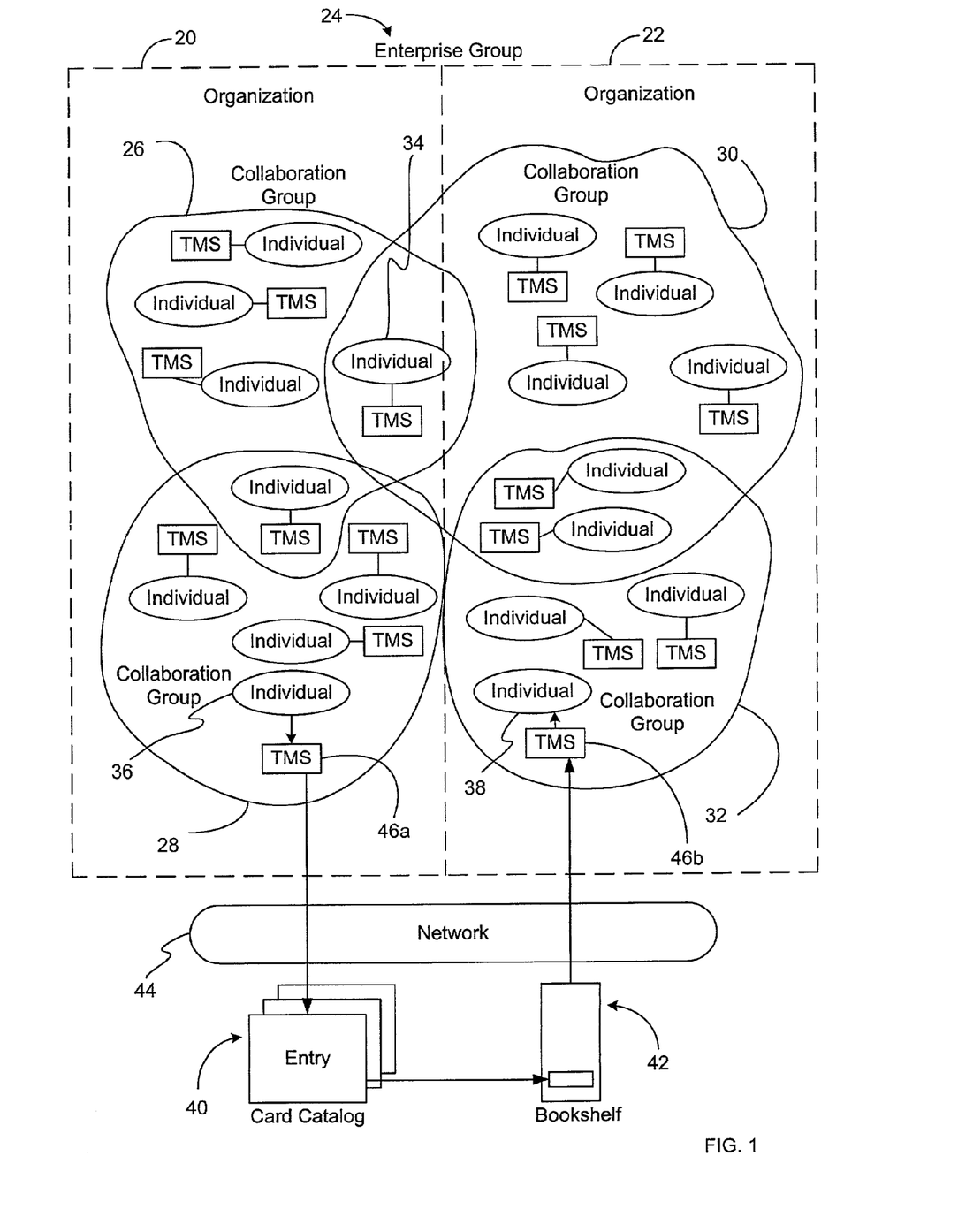
FIG. 1 is a diagram demonstrating the usefulness of the present invention in relation to an enterprise group having a plurality of organizations, collaboration groups, and individuals.

Turning now to FIG. 1, the usefulness and functionality of the present invention can be better appreciated. As already discussed, the growing trend in the present-day economy is for two or more organizations to join together in a joint "enterprise" in order to reap the benefits associated with economies of scale, resource efficiencies, technical specializations, etc. Thus, an organization 20 (such as an aircraft manufacturer) might join together with an organization 22 (such as a raw materials vendor) to form an enterprise group 24 for the purpose of developing or improving a given technology (such as improving aircraft skin panels). Organization 20 might have a plurality of collaboration groups 26, 28 made up of a plurality of individuals. Similarly, organization 22 (i.e., the vendor) will have a plurality of collaboration groups 30, 32 including a plurality of individuals. It is important to note that it is not uncommon for certain individuals such as individual 34 to be a member of a collaboration group 30 from another organization 22 as well as his or her own collaboration group 20. This boundary-crossing relationship presents significant problems under conventional approaches to technology management.

In the above example, it is easy to understand that an individual 36 may want to share information or ideas with an individual 38 from another collaboration group 32 but within the same enterprise group 24. It is important to note that these individuals 36, 38 may be physically located half-way around the world from one another and may be separated by several time zones. The present invention provides a mechanism for individuals 36, 38 to collaborate with one another within the confines of the overall enterprise. Generally, the present invention provides a card catalog 40 and a bookshelf 42 that are maintained and accessible over a network connection (preferably the Internet-based World Wide Web). As will be discussed below, the networking connection 44 provides a level of remoteness that is unachievable through conventional approaches.

It is also important to point out that each individual within the enterprise group 24 has a technology management system 46 (or TMS) that provides the individual with the ability to populate the card catalog 40 in the capacity of a steward. This approach is quite different from the cybrarian approach of conventional techniques and systems. As already noted, the steward approach represents a maximum distribution of responsibilities and results in a significantly greater level of flexibility.

Thus, individual 36 is able to create an entry in the card catalog 40, where the entry contains both the content (relaying the information or ideas) as well as critical information relating to various collaboration parameters. For example, each entry can define when and under what circumstances other individuals will have access to the entry. Based on this collaboration information, the entry will be "published" to the bookshelf 42 via a unique linking process. Generally, the bookshelf is a collection of links to the entries in the card catalog 40. Individual 38 uses the present invention to access these links as they are published to the bookshelf 42. It is important to note that user 38 will only be able to access the link if the originating entry so specifies. Maintaining both the card catalog 40 and the bookshelf 42 over the networking connection 44 solves many of the problems associated with conventional approaches.

Specifically, World Wide Web (WWW) technologies provide a ubiquitous, worldwide method for providing digital connectivity—between persons as well as information. In fact, the architecture of the present invention leverages the continuous improvement of Intranet infrastructures. Furthermore, the present invention will provide a mechanism for effectively planning and evaluating its own impact on basic computing infrastructures. It is also important to note that under the present invention human interfaces are preferably browser-based. Browser technologies will continue to mature in their availability to present dynamic and multimedia objects to the computer screen as well as to a variety of devices.

Figure 2:
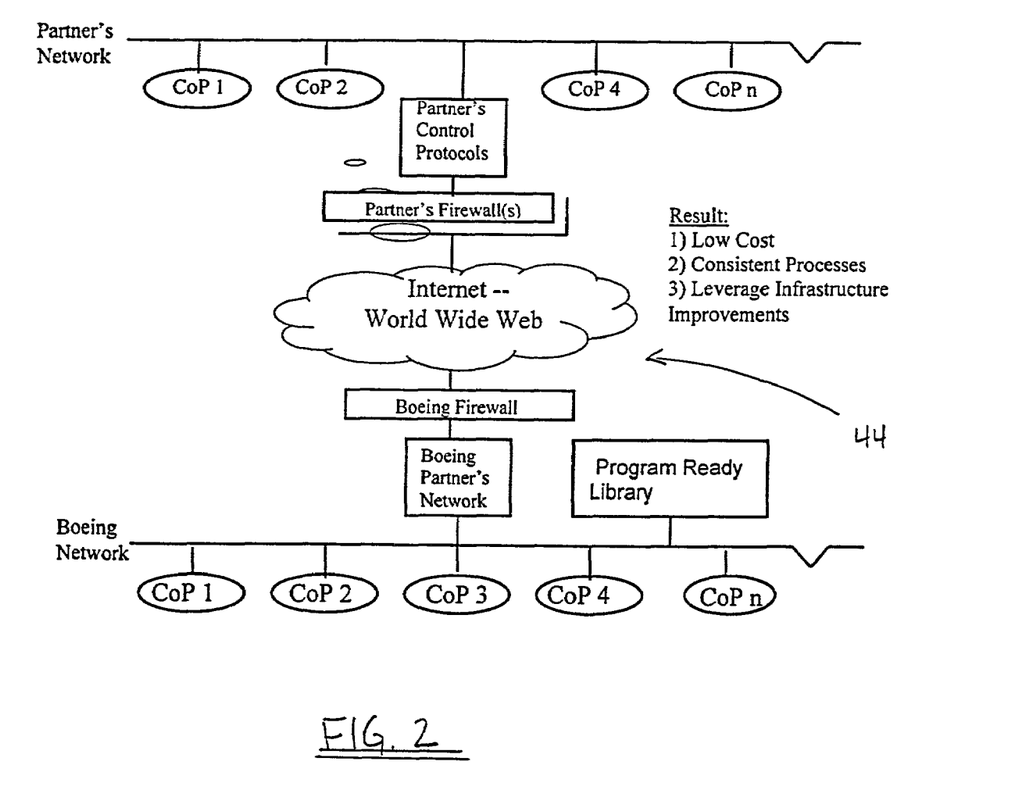
FIG. 2 is a diagram demonstrating operation of the present invention between a plurality of organizations.

Thus, a key objective of the present invention is to support collaboration between project and program teams (i.e., collaboration groups) of the extended enterprise—suppliers, customers, and regulators. The approach of the present invention is to leverage the current and future capabilities of partnership networks and other infrastructure capabilities. The present invention focuses on making partnership networks and other capabilities easy to deploy and administer with respect to selected collaboration tools and web portal technologies. FIG. 2 depicts an example relationship of collaboration groups (illustrated as communities of practice—CoP's) and collaboration tools deployed such that they operate through the firewall security of both Boeing and business partners. In this example, the present invention is used to work within the framework of the Boeing firewall security and the Boeing Partner's Network (BPN) for end-to-end protection of information developed and shared by the Boeing extended enterprise. The result is lower costs, more consistent processes, and more leverage infrastructure improvements.

Figure 3:
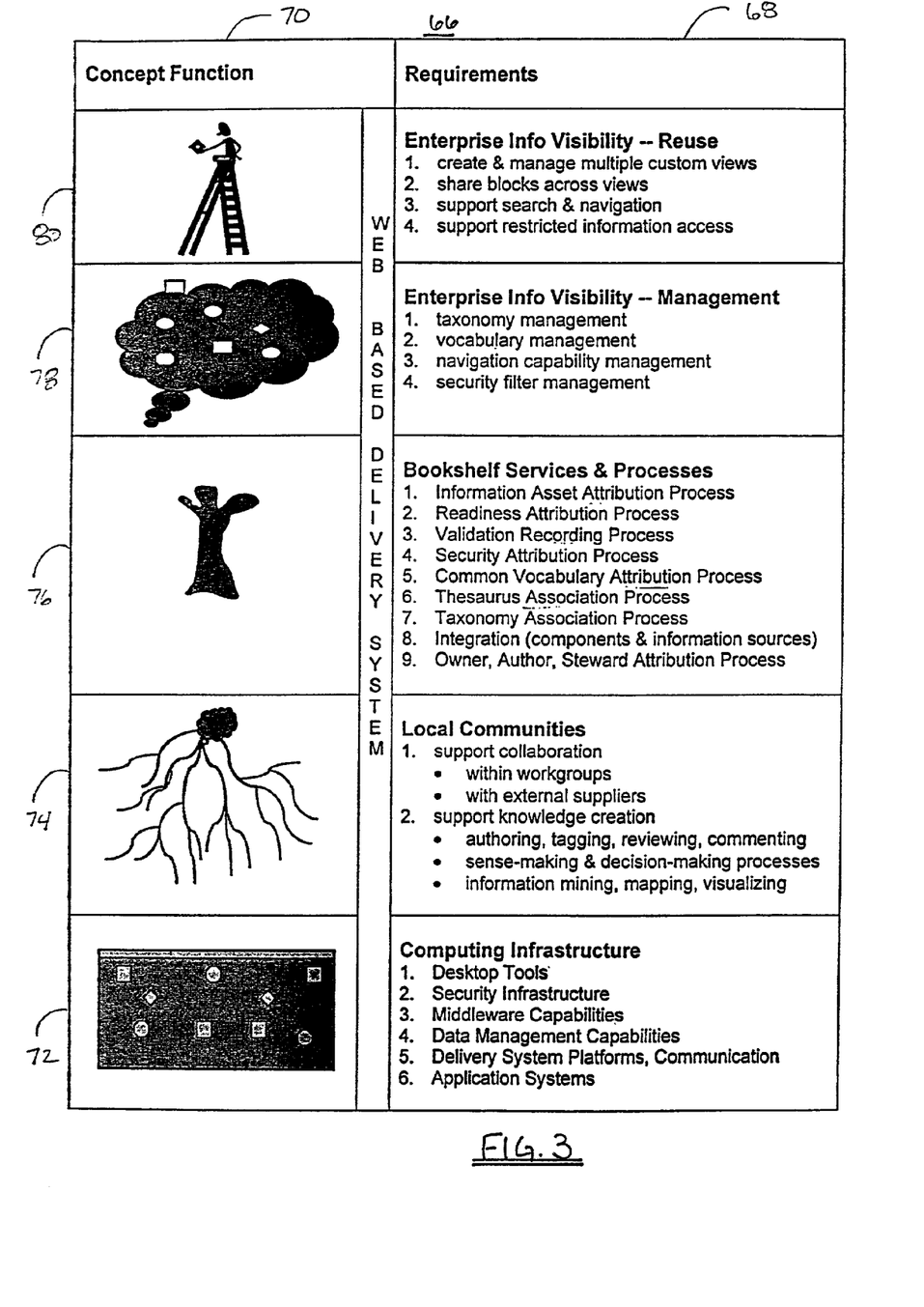
FIG. 3 is a chart demonstrating the various levels of technology management provided by the present invention.

Turning now to FIG. 3, chart 66 shows a conceptual breakdown of the functions performed by the present invention. It will be appreciated that the notion of a "tree" provides an analogy for describing the basic functions that can be supported to operate the technology management system of the present invention. Chart 66 identifies the five basic functions as they relate to the tree analogy and represents the main infrastructure requirements that support and enable these functions. While the technology management system meets all of the requirements shown in column 68 of chart 66, it is important to note that the present invention can be divided into conceptual functions as shown in column 70 of chart 66.

For example, at the lowest level shown in row 72 lies the computing infrastructure. At this level the present invention meets the most basic requirements of providing desktop tools, a security infrastructure, middleware capabilities, data management capabilities, delivery system platforms, communication, and application systems. At the next level, as shown in row 74 of chart 66, the present invention meets local community requirements. This level is analogous to the "roots" of the tree. Local community requirements can be divided into the broad categories of supporting collaboration and supporting knowledge creation. Collaboration can take place within work groups (i.e., collaboration groups), with external suppliers, or with any other appropriate organization. Knowledge creation is supported by providing a mechanism for authoring, tagging, reviewing, and commenting on information. Support is also provided for sense-making and decision-making processes, information mining, mapping, and visualizing.

It can further be seen that the present invention functions as the "trunk" of the tree by meeting bookshelf service and process requirements shown in row 76 of chart 66. This includes processes such as information asset attribution, readiness attribution, validation recording, security attribution, common vocabulary attribution, thesaurus association, taxonomy association, integration, and owner, author, and steward attribution. The next row 78 of chart 66 represents the "leaves" of the tree. At this level, the management of enterprise information visibility is provided. This includes taxonomy management, vocabulary management, navigation capability management, and security filter management. At the top level, shown in row 80, users are able to access the leaves of the tree. This requires the creation and management of multiple custom views, the sharing of blocks of cross views, the support of search and navigation, and the support of restricted information access. Thus, the technology management system of the present invention meets the requirements of an enterprising endeavor at all levels.

Figure 4:
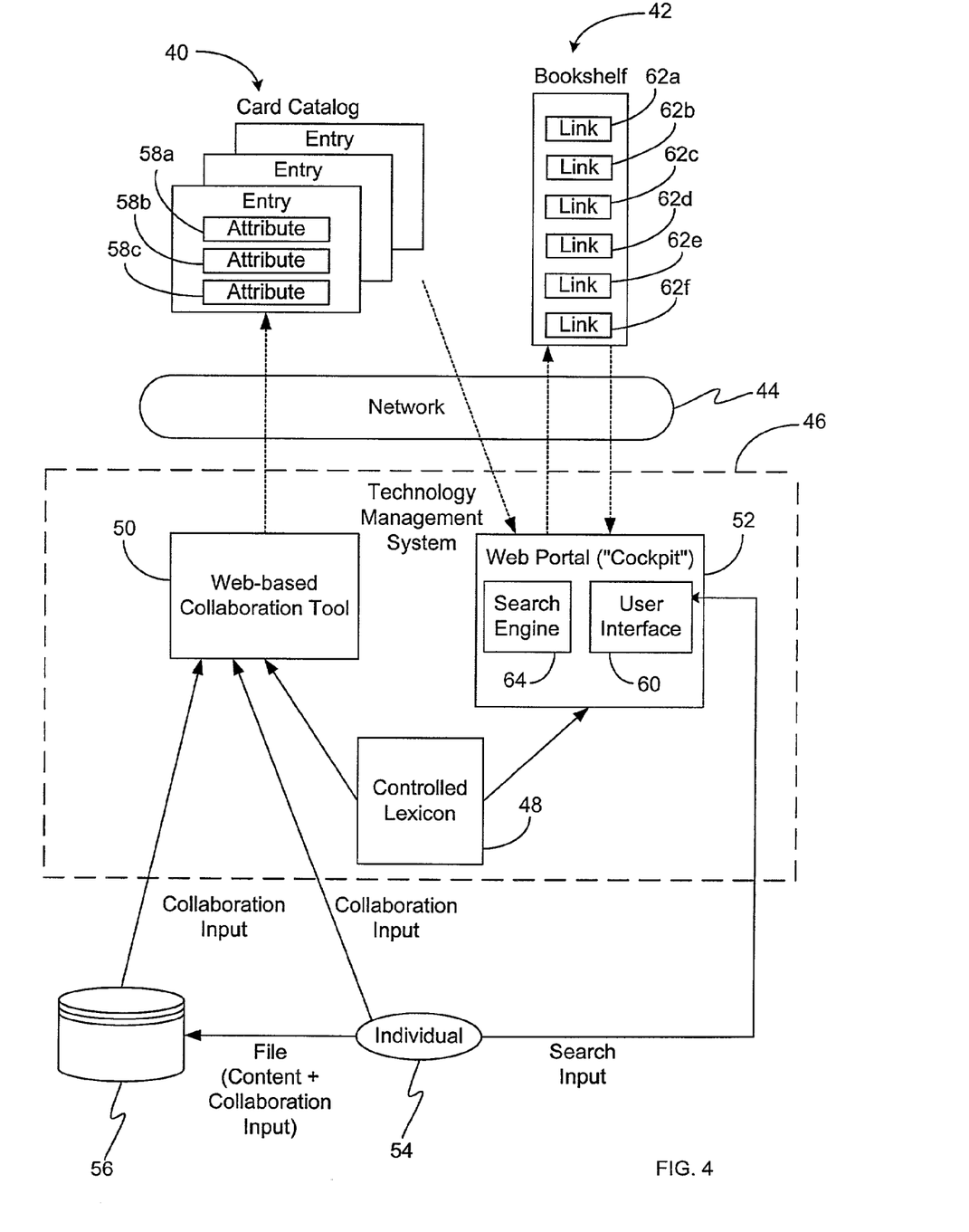
FIG. 4 is a block diagram of a technology management system according to one embodiment of the present invention.

Turning now to FIG. 4, a preferred technology management system 46 is shown in greater detail. Generally, the management system 46 has a controlled lexicon 48 containing technology-specific terminology data. The controlled lexicon 48 can be thought of as a specialized thesaurus. For example, one such thesaurus has been developed by Boeing and contains 40,000 to 50,000 terms as well as approximately 20,000 connections between these terms. Many of the terms relate to various aspects of aircraft manufacturing and design. Thus, in the preferred case, the terminology data relates to aircraft technologies. It is useful, however, for the thesaurus to also include broader terms such as those used for vehicles, in general. Naturally, it is necessary to include terms dealing with general mechanical, electrical, hydraulic, and other disciplines, which may be the primary occupation of the suppliers of aircraft parts and equipment. This enables the support of the extended enterprise discussed above.

It is important to note, however, that while the present invention will primarily be described with reference to the aircraft manufacturing industry, the scope of the invention is not so limited. Thus, the technology management system of the present invention can readily be applied to the other technologies without parting from the nature and spirit of the invention. As such, any thesaurus or controlled lexicon can be used as appropriate for the type and scope of the enterprise making use of the system.

It can be seen that the management system 46 further includes a web-based collaboration tool 50 for maintaining the card catalog 40 based on the technology-specific terminology data and based on collaboration input. As will be discussed below, the collaboration input can be obtained from a number of sources. A web portal 52 maintains the bookshelf 42 of links 62 to entries in the card catalog 40. The web portal 52 further accesses the bookshelf 42 based on search input and based on the technology-specific terminology data. Thus, both the collaboration tool 50 and the web portal 52 use the controlled lexicon 48 to perform their respective functions.

With regard to the terminology data contained in the controlled lexicon 48, it will be appreciated that this information is useful for a number of purposes. For example, when the entry is being added to the card catalog 40 the user may desire to select keywords that are representative of the content of the entry. The keywords selected by the individual 54, however, may not be the same keywords that another individual would use. Thus, the controlled lexicon 48 provides synonyms for the selected keywords that have a specific technological focus. The controlled lexicon 48 can also be used to find links contained in the bookshelf 42 for the same reasons discussed above. Thus, an individual desiring information about a certain keyword (or search term) does not have to use the specific terminology chosen by the author.

Collaboration Tool-Controlled Lexicon

Figure 5:
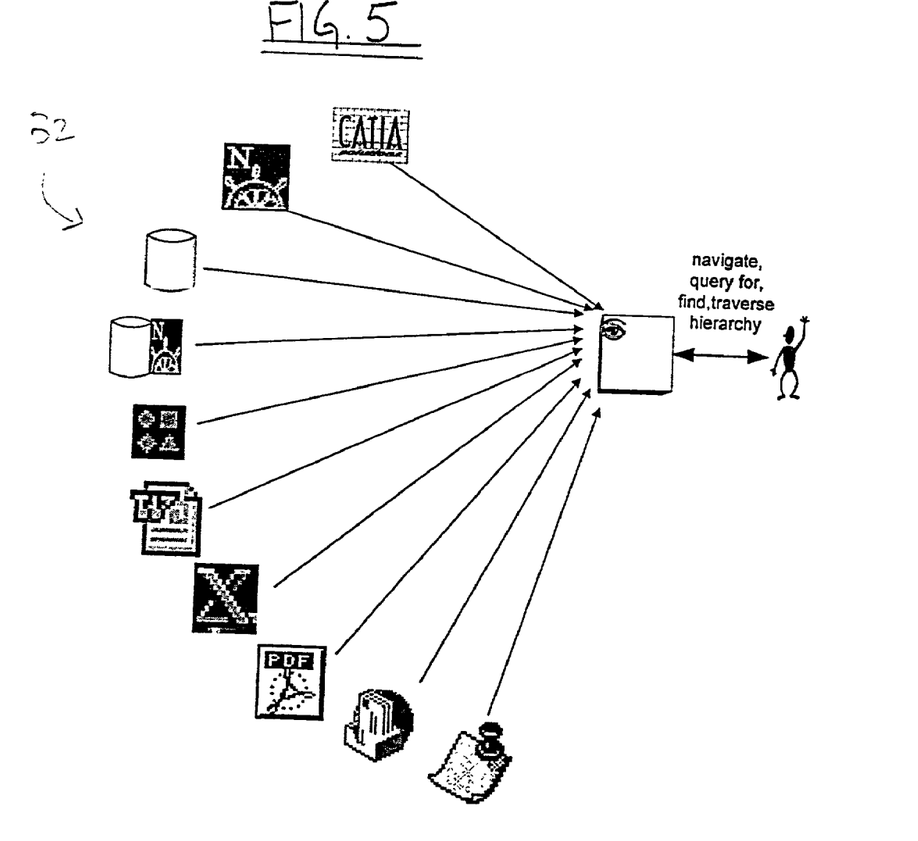
FIG. 5 is a diagram demonstrating the acceptance of various electronic file formats according to one embodiment of the present invention.
Figure 6:
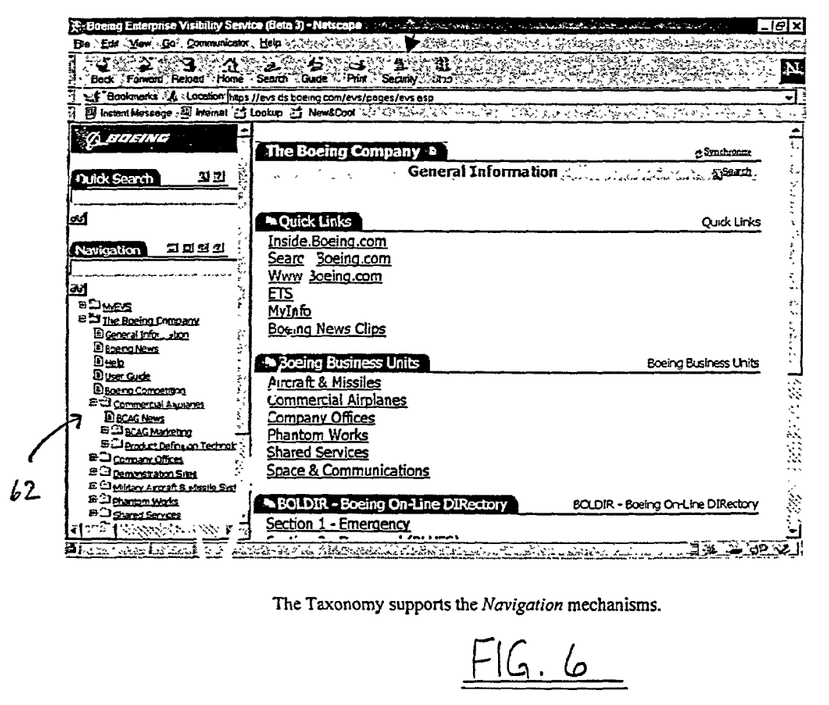
FIG. 6 is an illustration of a customizable user interface of a web portal according to one embodiment of the present invention.

It is preferred that the collaboration tool 50 converts the collaboration input into metadata, where the collaboration input has a corresponding content. As shown in FIG. 5, the content 82 can be a document (such as a memo, letter, etc.), image, drawing, spreadsheet, or any other type of electronic information that may be useful in the innovation process. This information will be generally referred to herein as an electronic file. Returning now to FIG. 4, it can be seen that the individual 54 can either include the collaboration input in the file, which is stored in database 56, or may provide the collaboration input directly to the collaboration tool 50 (or both).

Depending upon the particular application, the metadata generated by the collaboration tool 50 can relate to any number of types of information. For example, the metadata can be viewed as a collection of attributes 58, which are preferably agreed upon at the enterprise level. It is important to note that certain attributes can be classified as required for entry of the content into the card catalog 40, and others may be classified as optional. Thus, the metadata can include readiness attribute information, where the readiness attribute information defines a readiness for linking of the content to the bookshelf 42. For example, readiness might be ranked on a scale of 1 to 4, with "1" being most ready for publishing and "4" being least ready for publishing. Thus, the individual 54, having knowledge of the content of the electronic file, could define readiness as part of the collaboration input. The web portal 52 would therefore periodically check the entries in the card catalog 40 for entries having a readiness of "1".

Other attribute information might include steward attribute information, where the steward attribute information defines a responsible party for the content. It is important to note that the steward may or may not be the actual author of the content. Thus, the metadata may also include author attribute information, where the author attribute information defines an author of the content.

The metadata may further include location attribute information, where the location attribute information defines a file location of the content within the database 56. This location may be either on a local file server with respect to the individual 54 or may be located somewhere on the network which is accessible via networking connection 44. It is also preferred that the metadata includes notification attribute information, where the notification attribute information defines individuals to be notified of the conversion of the collaboration input into metadata. These individuals can be identified as being members of the desired enterprise group, organization, or collaboration group. Individuals can also be identified on an individual-by-individual basis.

It is highly preferred that the metadata includes security attribute information, where the security attribute information defines security requirements for accessing the content. In another aspect of the invention, the metadata includes date attribute information, where the date attribute information defines a conversion date for the collaboration input (i.e., date the metadata is created). The data attribute information may also define a creation date for the content.

The metadata may further include title attribute information, where the title attribute information defines a title for the content. It will be appreciated that certain attributes 58 are particularly useful in searching (for example, date, title, and author), while other attributes 58 are more useful in managing the overall system (for example, steward, readiness, and location). It is important to note that the collaboration tool 50 is customizable to meet the needs of the enterprise group as well as the individual. Commercially available technologies and software packages for implementing the collaboration tool 50 are listed in Tables I through IV below. The presently preferred package is Intraspect® software.

TABLE I

Support to Processes in:
Exploiting Existing Information Sources;
Cataloging Local Information;
Using Filtering Services;
Using Synthesis Services; and
Using Facilitated Transfer: Knowledge Shoppers.

| CLASS of Technology | Short description of the class | PRODUCT | VENDOR |
|---|---|---|---|
| Web/Intelligent Agents | Small helper applications that use a combination of profiling techniques, search tools, and recognition techniques to provide pushed info to a user on a regular basis. | Alexa | Alexa Internet |
| | | Copernic | Agents Technologies |
| | | LiveAgent Pro | AgentSoft Ltd |
| | | NetGetIt | Crossproduct Solutions |
| | | Odyssey | General Magic |
| | | Smart Bookmarks | FirstFloor |
| | | WebCompass | Quarterdeck |
| | | WebWhacker | Blue Squirrel |
| | | Who's Talking | Software Solutions |
| Hypertext Analysis & Transformation | Support analysis and transformation of hypertext data, typically Web pages. The WAIS (Wide Area Information Server) is among the first of its type. | Altavista Search | Digital Equipment |
| | | Cambio | Data Junction |
| | | Compass Server | Netscape |
| | | Dynamic Reasoning Engine | Neurodynamics |
| | | EXTRACT Tool Suite | Evolutionary Technologies |
| | | Index Server | Microsoft |
| | | Integrity | Vality Technology Inc. |
| | | Intelligent Miner for Text | IBM Corporation |
| | | LinguistX | Inxight Software, Inc. |
| | | NetOwl Intelligence Server | IsoQuest, Inc. |
| | | RetrievalWare | Excalibur Technologies |
| | | Search'97 | Verity, Inc. |
| | | SearchServer | Fulcrum Technologies |
| | | SmartCrawl | Inktomi |
| | | Ultraseek | InfoSeek corporation |
| | | Webinator | Thunderstone |
| | | Zylindex | ZyLab International |
| Information Visualization | Support tools the allow the user to get a better understanding by associating and then providing images that represent the associations between information groupings. | Discovery for Developers | Visible Decisions Inc. |
| | | SemioMap | Semio Corporation |
| | | SmartContent System | Perspecta |
| | | UMAP | TriVium |
| | | Spotfire Pro Visual Insights | IVEE Development Lucent Technologies |
| | | VizControls | Inxight Software, Inc. |
| | | WEBCOM | Helsinki University |
| Knowledge Mapping | More associated with the process and disciplines of developing context and frameworks for information. Some knowledge maps associate users with | KPMG KM Mapping Methods | KPMG Peat Marwick |
| | | Renaissance Mapping Methods | Renaissance Worldwide |

TABLE I-continued

Support to Processes in:
Exploiting Existing Information Sources;
Cataloging Local Information;
Using Filtering Services;
Using Synthesis Services; and
Using Facilitated Transfer: Knowledge Shoppers.

| CLASS of Technology | Short description of the class | PRODUCT | VENDOR |
|---|---|---|---|
| | generators of information | | |
| Data Mining | | Semio | Semio Corp |
| | | Darwin | Thinking Machine Corp. |
| | | Intelligent Miner | IBM |
| | | Poly Analyst | Megaputer |
| | | Clementine | SPSS |
| | | Enterprise Miner | SAS |
| | | Alice | Isoft |
| | | Neural Works Professional II | NeuralWare |
| | | CART | Salford Systems (Decision Trees) |
| | | Mineset | Silicon Graphics |
| | | Decisionhouse | Quadstone |
| | | SLP | Infoware |

TABLE II

Support to Processes in:
Exploiting Existing Information Sources;
Authoring Information;
Publishing Information;
Using Synthesis Services; and
Using Presentation Services.

| | | PRODUCT | VENDOR |
|---|---|---|---|
| Desktop Tools: General Analysis | Tools used to analyze information that are common to most computing desktops of information workers. | Access DBMS Excel Spreadsheet Forest & Trees Business Objects and many more | Microsoft Microsoft MIP Software Business Objects |
| Desktop Tools: General Authoring/ Displaying | Tools used to scour large data and document sets for latent trend information. | Visio Crystal Reports Microsoft Powerpoint Harvard Graphics and many more | Visio Corporation Stafford Technology Microsoft Software Publishing Corporation Holdings, Inc. |

TABLE III

Support to Processed in:
Cataloging Local Knowledge;
Providing Local Schema Management;
Providing Local Linkage Management;
Providing Meta-data Management;
Providing IKM Bookshelf Thesaurus Terms;
Providing IKM Bookshelf Linkages; and
Providing Knowledge Configuration Management.

| | | PRODUCT or STANDARD | VENDOR or ORGANIZATION |
|---|---|---|---|
| Tagging Tools & Related Standards | Tools used to describe and manage an information asset using words | Basic Text Book Tagging Boeing Tagging Boeing Web Page Requirements Dublin Core RDF | MARC AACR2 ISBD 6-6500-WEB-95-01 Rev B Resource Description Format |
| HTML & XML Files | Tools used to scour large data and document sets for latent trend information. | OASIS XML XSL XLL | Organization for the Advancement of Structured Information Standards Extensible Mark-up Language Standards |
| Linking: Thesaurus | | ET! by CP Software LEXICO2 MULTITES. STRIDE TCS (Thesaurus Construction System) TERM MANAGER InfoPlus | CP Software Diversified Data Technologies Developed by Hector Echevarria. Questans Caxton Software Information Dimensions |

TABLE IV

Support to Processes in:
Using Retrieval Services;
Using "Filtering" Services;
Using Subscription Services;
Using Ranking Services;
Using Distribution Services;
Using Synthesis Services;
Using Delivery Services; and
Using Presentation Services.

| | PRODUCT or STANDARD | VENDOR or ORGANIZATION |
|---|---|---|
| Visibility Software | Updating and Displaying Information - Web User Interface Standards Audio | |
| | ISOC RFC (Y-1996) | Extension to HTML: Client-side Image Maps |
| | Graphics | |

TABLE IV-continued

| Support to Processes in: Using Retrieval Services; Using "Filtering" Services; Using Subscription Services; Using Ranking Services; Using Distribution Services; Using Synthesis Services; Using Delivery Services; and Using Presentation Services. | PRODUCT or STANDARD | VENDOR or ORGANIZATION |
|---|---|---|
| | ISO 8632 | IT Computer Graphics Metafile for Storage |
| | ISOC RFC 1980 | (Y-1996) Extension to HTML: Client-side Image Maps |
| | RFC 2122 (Y-1997) | Versatile Multimedia Interface (VEMMI) |
| Pictures | | |
| | ISO 8632 (Y-1992) | IT Computer Graphics Metafile for Storage and Transfer of Picture Description Info Transfer of Picture Description Info |
| | ISOC RFC 2122 (Y-1997) Versatile Multimedia Interface (VEMMI) | ISOC RFC 2122 (Y-1997) Versatile Multimedia Interface (VEMMI) |
| | Netscape (Y-1997) | Dynamic HTML Version 4 |
| | W3C CSS (Y-1992) | Cascading Style Sheets, Level 1 |
| | HTML 4.0 (Y-1997) | Hypertext Markup Language HTML Spec 4.0 |
| | W3C HTML CSS W3C XML (Y-1998) | Extensible Markup Language (SML) V 1.0 |
| Text | | |
| | ISO 8879 (Y-1986) | IP Test & Office Systems Standard |
| | ISOC RFC 1648 (Y-1994) | Postmaster Convention for X.400 Opns |
| | ISOC RFC 1874 Y-1995) | SGML Media Types (MIME) |
| | ISOC RFC 2070 (Y-1997) | Internationalization of the Hypertext |
| | ISOC RFC 2111 (Y-1997) | Content-ID and Message-ID |
| | ISOC RFC 2122 (Y-1997) | Versatile Multimedia Interface (VEMMI) |
| | W3C CSS (Y-1992) | Cascading Style Sheets, Level 1 |
| | HTML 4.0 (Y-1997) | Hypertext Markup Language HTML |
| | W3C HTML CSS W3C XML (Y-1998) | Extensible Markup Language (XML) V. 1.0 |
| Video | | |
| | ISOC RFC 2122 (Y-1997) | Versatile Multimedia Interface (VEMMI) |
| | OMG (1997) | Control and Management of A/V Streams |
| Knowledge Management Software | Agentware i3 | Autonomy, Inc |
| | Dataware II KMS | Dataware, Inc |
| | DeliveryMANAGER | VIT |
| | Firefly Passport Office | Microsoft |
| | Folio Development Suite | Open Markets, Inc |
| | InfoMagnet | CompassWare |
| | Knowledge Server | Intraspect |
| | KnowledgeX | KnowledgeX, Inc. |
| | Livelink Intranet | Open Text, Inc. |
| | Wisdom Builder | Wisdom Builder, LLC |
| | WiseWire | Lycos Corporation |
| Special Retrieval Services | | |
| Special Distribution Services | | |

As already noted, the collaboration tool 50 also uses information from the controlled lexicon 58 in the conversion process. For example, the metadata may also include keyword attribute information, where the keyword attribute information defines keywords relating to the content. The individual 54 may define certain keywords, while the controlled lexicon 48 provides technology-specific terminology data (i.e., thesaurus equivalents) that the collaboration tool 50 also converts into metadata. It is important to note that the controlled lexicon 48 is a continuously changing, updateable knowledge-based lexicon. Thus, as technologies evolve and new terms are developed, the controlled lexicon 48 can be used to keep the management system 46 as up-to-date as possible.

With regard to the networking connection 44, it is preferred that the networking connection is either an Internet connection or an Intranet connection. The pervasiveness of WWW protocols lends itself to use with the present invention.

It is important to note that while FIG. 4 shows a single individual 54 both adding information to the card catalog 40 via the collaboration tool 50, and accessing the bookshelf 42 via the web portal 52, each individual within the enterprise group will have a similar management system 46. It is also important to note, however, that the particular technologies used to implement the various components of the management system 46 may vary from individual to individual. This flexibility is one of the reasons why the WWW is the preferred approach to implementing the networking connection 44. Thus, the collaboration input can be generated by a first user and the search input can be generated by a second user.

Notification Service

With continuing reference to FIG. 4, an important aspect of the technology management system 46 is the notification service 51. The notification service 51 can be used in various ways to keep individuals up-to-date. For example, a notification date can be assigned as one of the attributes 58 such that when the notification date expires, the steward is notified by the notification service 51. The steward may respond by replacing the information with a newer version, or removing the information (along with the card catalog entry) if it is no longer valid. The steward may also refresh the attributes 58 if the information is still valid and relevant, by extending the notification date.

The notification date is sometimes referred to as the "valid until date". Other display names for this tag might include "refresh date" or "keep until". The designated manager (also called out as an attribute in the card catalog) for the information can also receive notification if the steward has not updated the information within a predetermined grace period. Email addresses and other contact information regarding managers and stewards can be drawn from an enterprise directory (such as an LDAP service in the preferred embodiment). Since individuals are removed from the directory when they leave the organization, the notification service 51 is able to send email to the system administrator if the steward or manager has left the organization. It is also important to note that the notification service 51 may also be used to notify individuals other than stewards and managers of information additions and changes.

Web Portal-Controlled Lexicon

With continuing the reference to FIGS. 4 and 5, it can be seen that the web portal 52 includes a user interface 60, where the user interface 60 is customizable based on interface input from a user. The user interface 60 includes links 62 which are contained in the bookshelf 42. It is important to note that the web portal 52 preferably includes a search engine 64 for accessing the bookshelf 42 based on search input and based on the technology-specific terminology data from the controlled lexicon 48. With regard to the technology-specific terminology data, a context search would provide the user with choices to narrow the search. While the presently preferred software package for implementing the web portal 52 is commercially available Plumbtree, other suitable packages can be used.

Developing the Technical Infrastructure

Figure 7:
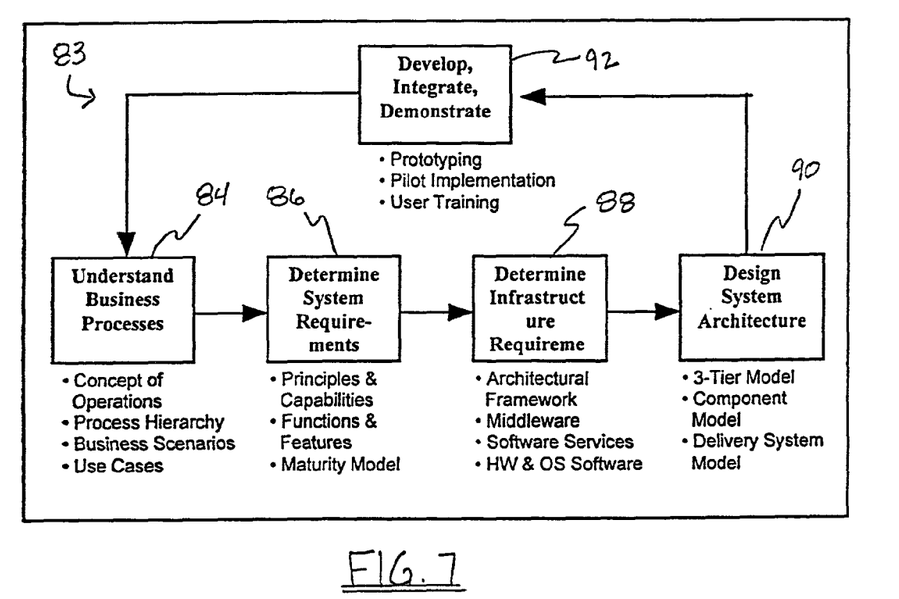
FIG. 7 is a flowchart of a method for developing a technical infrastructure according to the present invention.

Depending on the size of the organizations involved in the enterprise group, implementation of the above technology management system at all levels may take anywhere from a matter of days to a matter of years to complete. It is preferred that a spiral management approach be used to develop the technical infrastructure. The spiral approach is preferred because it accommodates significant changes in technology and supports the expected variety of requirements from supporting tacit-to-explicit knowledge capture to supporting tacit information sharing. The spiral approach also includes opportunities for learning by members of the core participants. FIG. 7 shows the preferred approach at 83. It is envisioned that three to four process iterations of the approach 83 will fully develop the technical infrastructure.

Specifically, it can be seen that step 84 is to understand (or define) business processes. Deliverables from this step include information such as a concept of operations, and a process hierarchy. At step 86 system requirements are determined. This preferably results in an understanding of principles, capabilities, functions and features. The infrastructure requirements are determined at step 88 and result in an architectural framework to be used at the system architecture design step 90. The primary deliverable from step 90 is a component model. At step 92 a prototype is developed, integrated, and demonstrated. This provides software selection criteria, software tools identification and trial use.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A technology management system comprising:
a controlled lexicon containing technology-specific terminology data;
a web-based collaboration tool for enabling individual stewards to populate a card catalog based on the technology-specific terminology data and based on collaboration input;
the individual stewards being from either a single collaboration group or from more than one collaboration group;
a web portal for maintaining a bookshelf of links to entries in the card catalog, the web portal further accessing the bookshelf based on search input and based on the technology-specific terminology data to enable individual users to access information stored in the card catalog, wherein the users are from at least one of a common collaboration group of different collaboration groups; and
a notification device that provides at least one of said single collaboration group and said more than one collaboration group with notification data based on said entries.

2. The management system of claim 1 wherein the collaboration tool retrieves the collaboration input directly from at least one of the stewards.

3. The management system of claim 1 wherein the collaboration tool retrieves the collaboration input from an electronic file, at least one of the stewards placing the collaboration input in the electronic file.

4. The management system of claim 1 wherein the collaboration tool converts the collaboration input into metadata, the collaboration input having a corresponding content.

5. The management system of claim 4 wherein the metadata includes keyword attribute information, the keyword attribute information defining keywords relating to the content.

6. The management system of claim 5 wherein the collaboration tool further converts the technology-specific terminology data into metadata based on the collaboration input.

7. The management system of claim 4 wherein the metadata includes readiness attribute information, the readiness attribute information defining a readiness for linking of the content to the bookshelf.

8. The management system of claim 4 wherein the metadata includes steward attribute information, the steward attribute information defining a responsible party for the content.

9. The management system of claim 4 wherein the metadata includes author attribute information, the author attribute information defining an author of the content.

10. The management system of claim 4 wherein the metadata includes location attribute information, the location attribute information defining a file location of the content.

11. The management system of claim 4 wherein the metadata includes notification attribute information, the notification attribute information defining individuals to be notified of the conversion of the collaboration input into metadata.

12. The management system of claim 4 wherein the metadata includes security attribute information, the security attribute information defining security requirements for accessing the content.

13. The management system of claim 4 wherein the metadata includes date attribute information, the date attribute information defining a conversion date for the collaboration input.

14. The management system of claim 4 wherein the metadata includes title attribute information, the title attribute information defining a title for the content.

15. The management system of claim 1 wherein the collaboration tool interacts with the card catalog over a networking connection.

16. The management system of claim 15 wherein the networking connection is one of an Internet connection and an Intranet connection.

17. The management system of claim 1 wherein the web portal interacts with the card catalog over a networking connection.

18. The management system of claim 17 wherein the networking connection comprises one of an Internet connection and an Intranet connection.

19. The management system of claim 1 wherein the web portal includes a user interface, the user interface being customizable based on interface input from a user.

20. The management system of claim 19 wherein the user interface includes links contained in the bookshelf.

21. The management system of claim 1 wherein the terminology data relates to aircraft technologies.

22. The management system of claim 1 wherein said notification data includes an expiration date of the entries.

23. The management system of claim 1 wherein said notification data includes employment information of the individual stewards.

24. A method for managing technologies among a plurality of individuals operating within a common collaboration group or within different collaboration groups, the method comprising the steps of:
   populating a card catalog over a networking connection based on collaboration input from a plurality of independent stewards;
   populating the card catalog using a controlled lexicon containing technology-specific terminology data;
   maintaining a bookshelf of links over the networking connection based on entries in the card catalog;
   enabling a plurality of different users within at least one of a common collaboration group and a plurality of different collaboration groups, to access the bookshelf based on search input provided by at least one user; and
   generating notices to said plurality of different users based on said entries.

25. The method of claim 24 further comprising the steps of:
   storing technology-specific terminology data to a controlled lexicon;
   maintaining the card catalog based on the technology-specific terminology data; and
   assessing the bookshelf based on the technology-specific terminology data.

26. The method of claim 24 wherein the stewards and the users are part of an overall enterprise group.

27. The method of claim 24 further comprising converting at least one of the collaboration input and the technology-specific terminology data into metadata, the collaboration input having a corresponding content.

28. The method of claim 24 wherein the notices include an expiration data of the entries.

29. The method of claim 24 wherein the notices include employment data of the plurality of different users.

30. A technology management system comprising:
   a controlled lexicon containing technology-specific terminology data;
   a web-based collaboration tool for enabling individual stewards to populate a card catalog based on the uncatalogued technology-specific terminology data and based on collaboration input;
   the individual stewards being from either a single collaboration group or from more than one collaboration group; and
   a web portal for maintaining a bookshelf of links to entries in the card catalog, the web portal further accessing the bookshelf based on search input and based on the technology-specific terminology data to enable individual users to access information stored in the card catalog, wherein the users are from at least one of a common collaboration group of different collaboration groups.

* * * * *